United States Patent [19]

Batson

[11] Patent Number: 4,790,712

[45] Date of Patent: Dec. 13, 1988

[54] LOG LOADING APPARATUS

[76] Inventor: Dossie M. Batson, 85124 N. Cloverdale Rd., Creswell, Oreg. 97426

[21] Appl. No.: 889,336

[22] Filed: Jul. 25, 1986

[51] Int. Cl.$^4$ .............................................. B65G 67/12
[52] U.S. Cl. ...................................... 414/399; 414/391
[58] Field of Search ............... 414/399, 401, 572, 391, 414/393, 396, 498

[56] References Cited

U.S. PATENT DOCUMENTS

| 146,436 | 1/1874 | Dilley .................................. 414/391 |
| 462,312 | 11/1891 | Goodyear . |
| 2,342,344 | 2/1944 | Hunter ................................. 414/399 |
| 2,919,822 | 1/1960 | Darnell . |
| 3,549,027 | 12/1970 | Batson . |
| 3,578,182 | 5/1971 | Harvey . |
| 3,764,029 | 10/1973 | Riley . |
| 4,439,098 | 3/1984 | Rienks . |

FOREIGN PATENT DOCUMENTS 2441179 11/1976 Fed. Rep. of Germany ...... 414/391
1194805 11/1985 U.S.S.R. .............................. 414/399
2084110 4/1982 United Kingdom ................ 414/399

Primary Examiner—Peter A. Aschenbrenner
Attorney, Agent, or Firm—Klarquist, Sparkman, Campbell, Leigh & Whinston

[57] ABSTRACT

An apparatus for loading and storing elongate load members such as logs includes a base frame and two pairs of opposed extensible columns pivotally connected to the frame. The apparatus is carried between loading sites on a truck bed from which it can be loaded and unloaded by its extensible legs that retract within and extend from each column. The legs are hydraulic cylinders that also extend the columns to lift the load. Each pair of upright columns are connected by cables that support a load as the columns are extended. A vehicle bed can then be backed onto the frame between the columns to receive the load. Each column includes a fairlead that enables the cables to raise the load twice the distance the columns are raised, so that the columns need only be extended half the height of the vehicle bed.

21 Claims, 4 Drawing Sheets

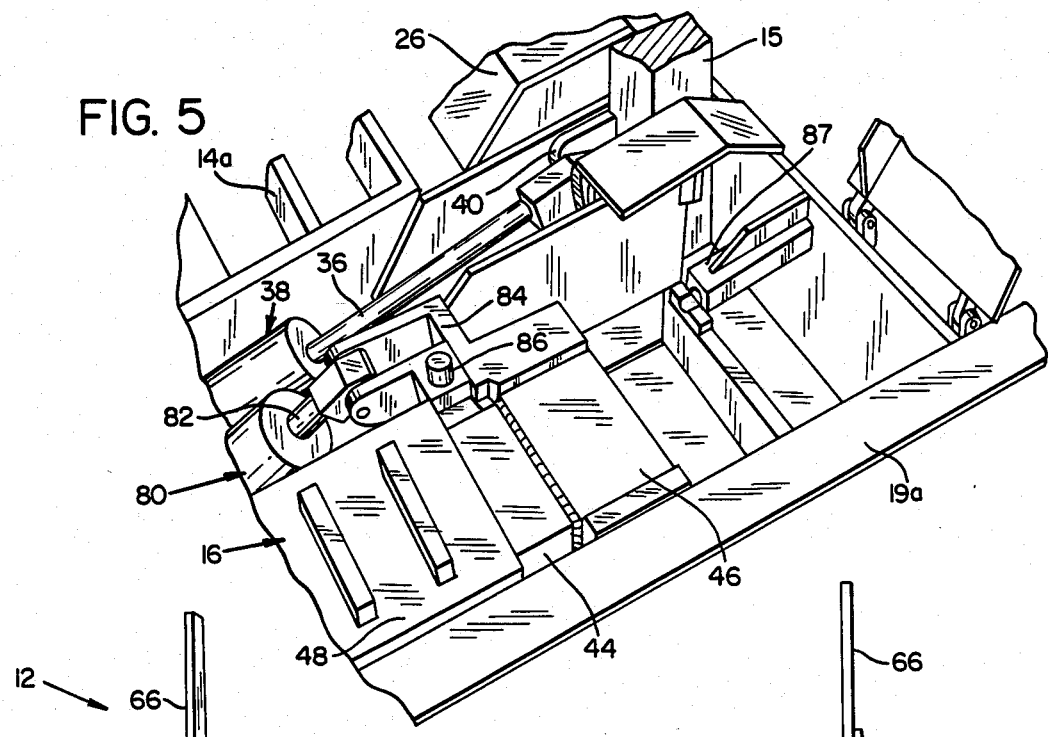
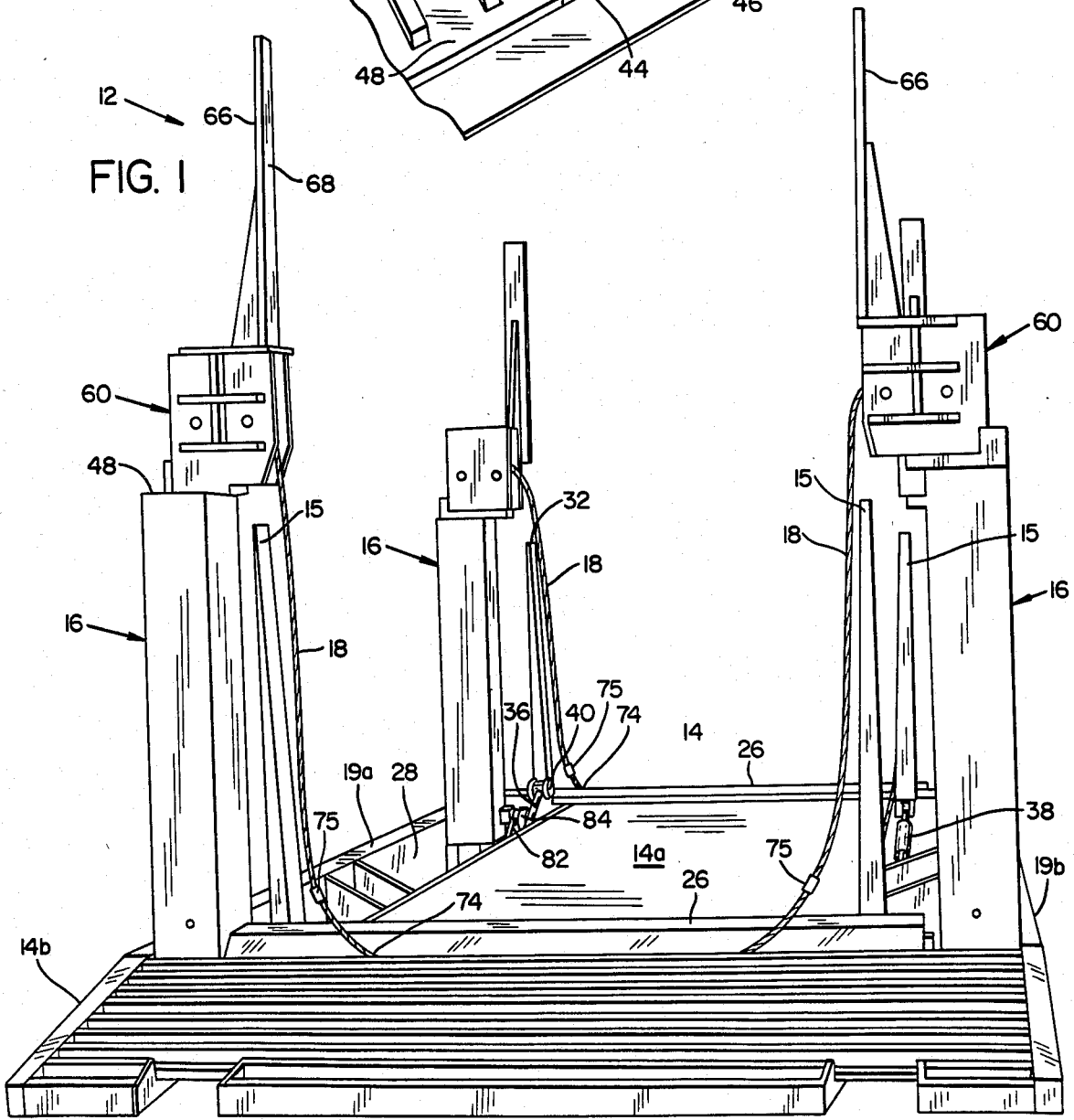

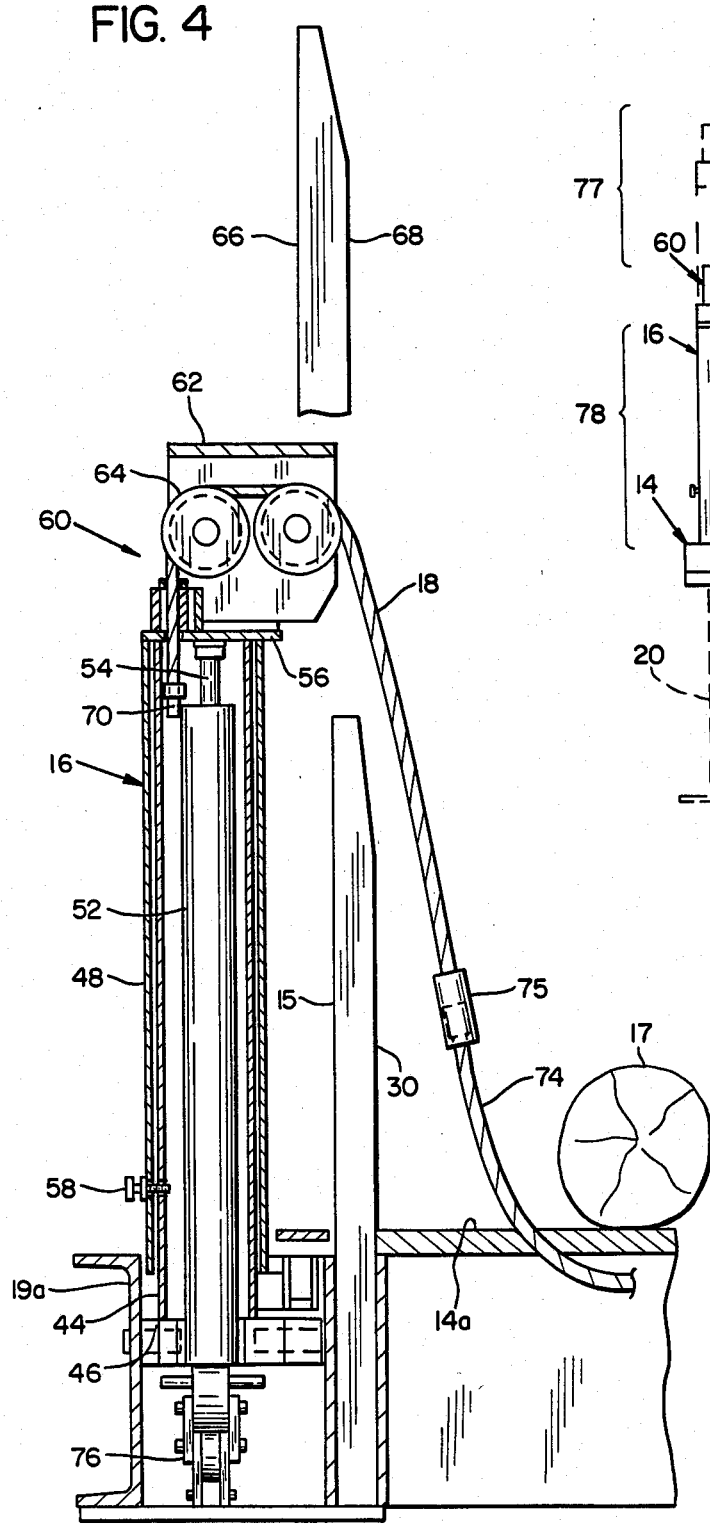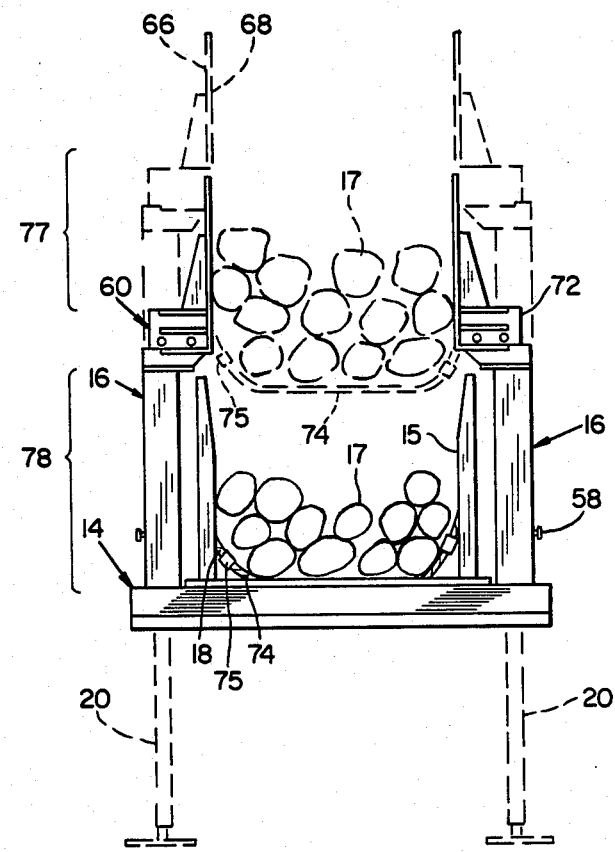

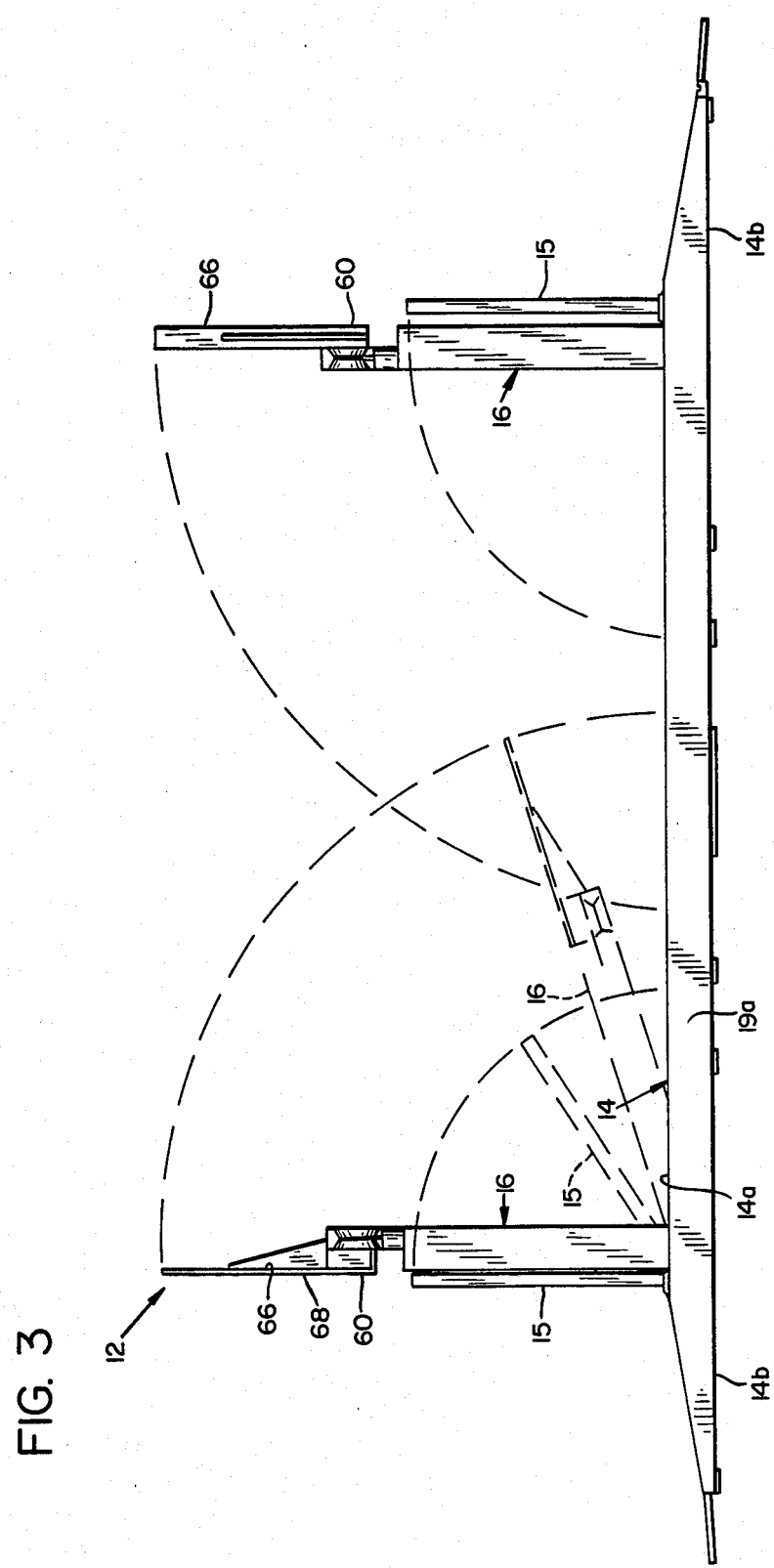

LOG LOADING APPARATUS

BACKGROUND OF THE INVENTION

This invention relates to apparatus for loading vehicles with assembled logs or other elongate loads and more particularly to such an apparatus that can be carried to the loading site by the vehicle to be loaded.

Traditionally, logs gathered at a forest loading site have been loaded onto logging trucks by a heavy-duty log loader equipped with a grapple. As each truck arrives at the site, the loader drops a load of logs onto the truck bed. Since each log truck must be loaded by the single loader, considerable time is lost when several trucks are waiting to be loaded. Consequently, the log loader is often inactive when no trucks are present for loading.

This drawback of the traditional loading system was largely met by the loading apparatus I disclosed in U.S. Pat. No. 3,549,027. That apparatus, simple and inexpensive, comprises a rectangular frame with several pairs of extensible columns for retaining and raising a load of logs. The logging truck can then back beneath the load of logs, which is lowered onto the truck bed. A truck can tow such apparatus behind it to the loading site so that no loading bottleneck is created. Moreover, because of its design, the apparatus does not require a specialized log loader but can be loaded by a bulldozer, rubber-tired skidder, or other tractor vehicle equipped with a front end loader or grapple.

Although my prior apparatus is a significant improvement over the traditional approach, it has a number of limitations. First, its large size and height require that it be towed to the loading site by a truck. Second, its extensible columns must extend considerably to raise the load of logs sufficiently high load. Third, it does not collapse into a convenient size for storage and transport.

Other log-loading apparatus in the prior art suffer from similar limitations. U.S. Pat. No. 3,764,029 to Riley discloses a log preloader that relies on an extensible column at one end of the loader and a collapsible bunk at the other end for partial elevation of the load. Like my prior apparatus, the columns of the Riley loader are not collapsible. The Riley loader can be carried on a truck bed, but it requires a complex system of jacks and cables to winch the loader on and off the bed.

Another preloading apparatus is disclosed in U.S. Pat. No. 2,919,822 to Darnell. Darnell relies on a cable arrangement for raising a load of logs. The apparatus itself must be lifted by other means onto the bed of a truck to move it between loading sites.

Other patents of interest are U.S. Pat. No. 4,439,098 to Rienks, U.S. Pat. No. 3,578,182 to Harvey, and U.S. Pat. No. 462,312 to Goodyear. None of these patents show log-loading apparatus but instead disclose lumber-handling devices with minor relevance to the art.

SUMMARY OF THE INVENTION

One object of the present invention is to provide an improved method and apparatus for loading logs and other elongate loads onto a vehicle.

Another object of the invention is to provide such an apparatus that can be transported conveniently to a loading site.

Another object of the invention is to provide such an apparatus that can be operated by one person.

Still another object of the invention is to provide a loading apparatus that can be self-loaded on and self-unloaded from a transport vehicle with the minimum of effort.

Another object is to provide an apparatus as aforesaid with improved means for lifting loads.

To achieve these objectives, a loading apparatus according to the invention comprises a base frame to which two pairs of opposed extensible load support columns are connected. Load support means on each column of a pair cooperatively raise and support a load therebetween with the columns extended. Extensible legs are connected to the base frame to raise and lower the frame from the bed of a vehicle such as a truck.

In one aspect of the invention, each extensible leg may comprise a section of an extensible column. Means within each column extend the column in an upward direction from the base frame to raise the load and extend the leg in a downward direction to elevate the frame. These means can comprise a common fluid-powered extensible cylinder with the rod extending the column upward and the chamber forming the leg and extending downward.

In another aspect of the invention, the load may be lifted between the columns by a multiplier means for raising the load a multiple of the distance the columns are extended. This multiplication minimizes the height to which the columns must be extended in order to raise the load to a level for loading on a truck bed.

With this apparatus, the method of the invention enables a vehicle to transport the loading apparatus to a loading site and the apparatus to unload itself by extending its legs to support the apparatus and then retracting its legs to lower itself to ground level. When loading operations at a site are finished, the apparatus loads itself onto a truck bed by extending its legs to elevate its frame above the bed to permit the bed to be moved beneath the frame, then retracting the legs to lower the frame onto the bed for transport.

In another aspect of the invention, the extensible columns and associated load-conforming stakes may be pivoted between upright and collapsed positions reserved within the frame to facilitate loading operations.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 1 is a perspective view of a loading apparatus to the invention.

FIG. 2 is a front view of the apparatus showing the extension of its columns and legs in phantom.

FIG. 3 is a side view of the apparatus showing the columns upright and also retracted in phantom.

FIG. 4 is a cross-sectional view of a column of the apparatus.

FIG. 5 is an enlarged view of a portion of the apparatus.

FIG. 7 is a sectional view taken along the line 7—7 of FIG. 1 to show the detail of one of the base frame gussets.

DETAILED DESCRIPTION OF PREFERRED EMBODIMENT

Figure 6A:
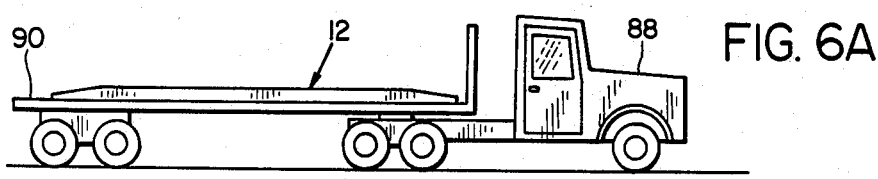
FIGS. 6A-6H are schematic views showing in sequence a method of using the apparatus.

FIGS. 1 through 3 show a storage and loading apparatus 12 according to the invention, the apparatus of a type commonly known as a loading bunk. As described in detail below, the apparatus 12 comprises a base frame 14 to which at least two pairs of laterally opposed extensible load support columns 16 are pivotally connected. The columns 16 of each pair are laterally spaced across the frame 14 from one another, and each pair is spaced longitudinally of the frame from the other pair. Adjacent to each column 16 is a load-retaining stake 15. A load support means, in this case column cables 18, for supporting a load 17 is connected to each column of a pair for cooperatively raising and supporting a load therebetween. Referring to FIG. 2, the columns 16 are extended to raise a load 17 as indicated in dashed lines. The apparatus 12 also includes means for raising and lowering the frame 14 including extensible legs 20 shown in dashed lines.

The base frame 14 is generally a bridge-like structure with longitudinal side frame members or beams 19a, 19b joined by cross frame members (not shown). It is generally trapezoidal in profile, with a rectangular center section 14a between opposite end ramp sections 14b. Mounted transversely across each end of center section 14a are berms 26. These berms form a means to support the load above center frame section so that the cables 18 may be joined beneath the load to support it. Center frame section 14a comprises steel grating with sufficient strength to support loaded vehicles driven across it. Longitudinal recesses 28 are defined between beams 19a, 19b and center section 14a to receive columns 16 and load-retaining stakes 15. The ramp sections 14b allow a truck to back onto the frame to accept a load. The frame 14 also serves as a bridge across which a truck can drive. It can be used, for example, to span small ravines, or soft or uneven ground.

The load-retaining stakes 15 are shown in FIGS. 1 and 3 mounted to the frame 14 inward of each load support column 16 and having a retaining surface 30 bordering center frame section 14a. Each stake 15 pivotally retracts into a recess 28 for storage and extends upright therefrom. The power means for pivoting each stake 15 are shown in FIG. 5. A rod 36 of a hydraulic cylinder 38 pivotally connects to a bracket 40 at the base of stake 15. The opposite end of the cylinder 38 (not shown) is connected to the base frame 14. Rod 36 is extended to pivot stake 15 upright, as shown in the FIG. 5, and retracted into cylinder 38 to lower the stake into recess 28. The operation of cylinder 38 is controlled by conventional hydraulic means (not shown) such as a hydraulic pump.

Each column 16 comprises three major components. A first column section 44 is connected to a pivoting block 46 that is axially mounted between center section 14a and the beams 19a, 19b. A second column section 48 is telescopically mounted over the first section 44 and is extensible upwardly therefrom. A third column section comprises an extensible hydraulic cylinder 52 within the first column section 44, with the lower end of the cylinder extending downward through an opening in the pivot block 46. A piston rod 54 extending from the upper end of the cylinder 52 is connected to a top plate 56 of the second column section 48.

First column section 44 is open at both ends to allow cylinder 52 to extend downwardly through pivot block 46 and for rod 54 to extend upwardly to raise second column section 48 above the first column section. Whether the rod 54 or the cylinder 52 extends is determined by means such as a locking pin 58 that can be inserted through aligned openings in adjacent sides of column sections 44, 48. With the pin 58 inserted to lock the sections together, cylinder 52 can extend downwardly. With the pin 58 withdrawn, rod 54 can extend the second column section 48 upwardly.

The second column section 48 has swivelly mounted atop its top plate 56 a fairlead 60, comprising a block 62 with a pair of pulleys 64 mounted therein. The fairlead swivels on a bearing 65 as the fairlead brushes against a load while the column 16 is pivotally extended or retracted from recess 28. Fixed to the top of the fairlead 60 is a load-retaining guide 66 with its inward retaining surface 68 aligned with the retaining surface 30 of the adjacent stake 15.

A first end of cable 18 is secured by a fastener 70 to an inner surface of first column section 44. It extends therefrom through an opening in top plate 56 and through cable guide 72 mounted to the top plate into fairlead 60. The cable 18 passes over the pulleys 64 and extends its second end to join an intermediate cable 74 at a choker 75.

The hydraulic cylinder 52 that comprises the third column section also forms the legs 20 when the cylinder extends downwardly from first column section 44. Pivotally attached to the cylinder 52 is a foot 76 for stabilizing the apparatus 12 when the cylinder acts as a leg to support the frame 14 free of the ground. The cylinder's operation is controlled by conventional hydraulic means (not shown).

FIG. 2 and 4 illustrate the functions of the different column sections. With locking pin 58 in place, extension of cylinder 52 causes piston rod 54 to lift both outer column section 48 and inner column section 44 together. Because inner column section 44 is connected to base frame 14 through pivot block 46, the entire base frame is raised from ground level, as shown in FIG. 2. When this occurs, cylinders 20 serve as legs to elevate the frame for loading the frame on a flatbed truck or trailer. However, when column sections 48, 44 are not pinned together by locking pin 58, extension of cylinder 20 causes piston rod 54 to lift only its connected outer column section 48. Because load cable 18 is anchored at 70 to inner column section 44, lifting of outer column section 48 causes a 2:1 elevation of load cable sling 18 to facilitate lifting a load of logs supported on the cable sling to an elevation for loading on a log truck-trailer. The fairlead 60 and cable 18 act with this extension as a means for raising the load 17 a multiple of the distance the second column section 48 is extended. As shown in FIG. 2, extending the second column section 48 a first distance 77 pulls twice that length of cable 18 through pulleys 64 to raise supported load 17 a second distance 78 twice the first distance. As it is raised from load-retaining stakes 15 past fairleads 60, the load 17 is held substantially in alignment by the parallel retaining surfaces 30 of stakes 15 and retaining surfaces 68 of guides 66. Other pulley arrangements are possible, of course, that can raise the load a second distance which may be a different multiple of the first distance 77.

As with the stakes 15, the columns 16 pivotally retract into recesses 28 for storage, as shown in phantom in FIG. 3, and extend therefrom to an upright position. FIG. 5 shows column 16 retracted. Referring to FIGS. 1 and 7, recesses 28 defined by beams 19a, 19b and central bridge portion 14a of base frame 14 must obviously be wide enough to receive columns 16 and stakes 15 when they are pivoted into their respective recesses. Gussets 29 reinforce the upright walls of recesses 28 midway between their ends. However, to provide space to accommodate overlapping guide stakes 66 when their corresponding columns 16 pivot into their common recess 28, gussets 29 have a steeply sloped upper edge 29a which intersects bridge portion 14a of the recess below the upper edge of such bridge portion. To prevent front guide stakes 66a at one side of the base frame from conflicting with rear guide stakes 66b at the same side of the base frame, front guide stakes 66a have their broad faces 68a facing the load, whereas rear guide stakes 66b have their thin edge 68b facing the load, and front guide stakes 66a are offset slightly toward the load from rear guide stakes 66b. A power means for pivoting each column 16 includes a hydraulic cylinder 80 and piston rod 82. The rod 82 is pivotally connected to a bracket 84 attached to the base of column 16. The cylinder 80 is connected to the frame 14 (not shown). Cylinder 80 is also controlled by conventional means (not shown). The upright position of column 16 is determined by the setting of a threaded, adjustable stop 86 on the bracket 84. The stop 86 contacts an abutment 87 on a cross frame member of frame 14. Stop 86 is a means for adjusting the upright position of a column 16 to accommodate an incline of the base frame 14 that may exist from setting it on sloping ground.

METHOD OF OPERATION

Figure 6B:
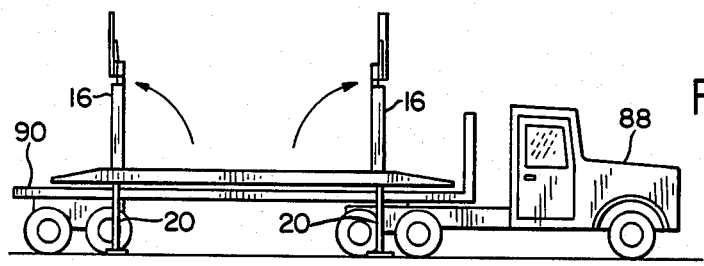
Figure 6C:
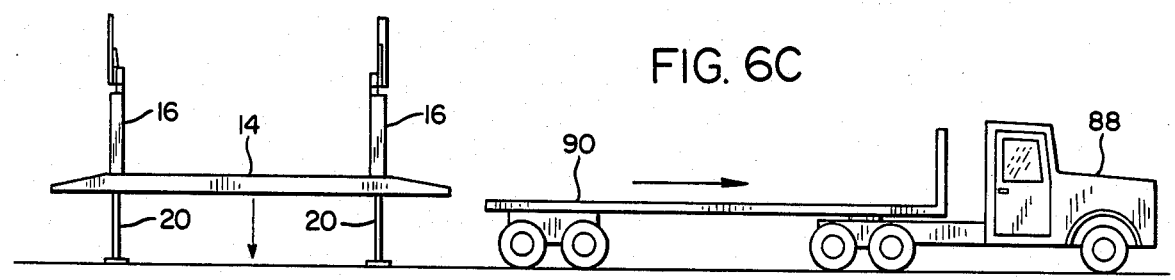

The operation of apparatus 12 is illustrated in FIGS. 6A-6H. In FIG. 6A, a truck 88 carries on its bed 90 the loading apparatus 12 to the chosen loading site. Columns 16 are then pivotally raised to the upright position, as shown in FIG. 6B. With the first and second column sections 44, 48 locked together, hydraulic cylinders 52 within the column are filled to extend legs 20 downwardly until the frame 14 is raised above the bed 90, as shown in FIG. 6C and the bed 90 is removed. The frame 14 is then lowered to the ground in FIG. 6D by retracting legs 20 within column 16.

Figure 6D:
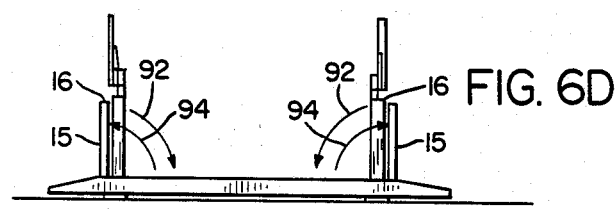
Figure 6E:
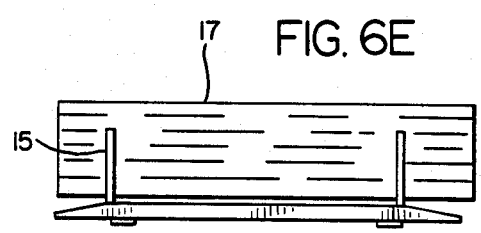

Because the columns 16 in their upright positions can interfere with the loading of the apparatus, they are pivotally retracted into recesses 28 as shown by arrows 92 in FIG. 6D. Load-retaining stakes 15 are pivotally extended as shown by arrows 94 to retain the load 17 to be loaded onto center frame section 14a. Logs or other elongate load members are then loaded, with the four stakes 15 upright as in FIG. 6E or with a different pattern of upright stakes such as a diagonal pair.

Figure 6F:
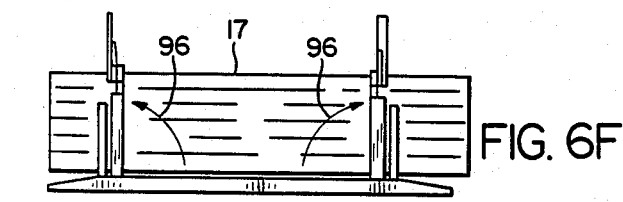
Figure 6G:
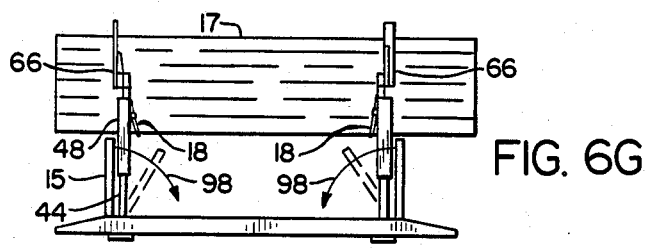
Figure 6H:
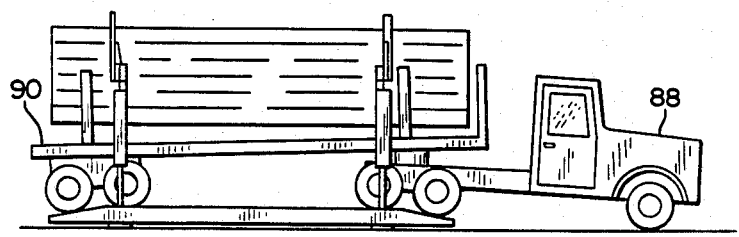

When the apparatus 12 is fully loaded and load 17 is ready to be transferred to truck bed 90, columns 16 are pivotally extended as shown by arrows 96 in FIG. 6F with the fairleads 60 swivelling as they brush against the load. The cables 18 are then connected to cable 74 which lies beneath the load 17. The second column sections 48 are then extended, as shown in FIG. 6G, to raise the load 17 through the multiplying action of fairlead 60 and cables 18 to a height above that of the truck bed 90. Load-retaining stakes 15 are also pivotally retracted as shown by arrows 98 to enable the bed 90 to pass between the columns 16. In FIG. 6H, the truck bed 90 is backed beneath the load 17 and the extended columns 16 are then lowered slightly to place load 17 on the bed 90. The cables 18 and cable 74 are unhooked and cables 18 withdrawn. The truck 88 is now loaded and can be driven away.

To move apparatus 12 to a new loading site, several of the steps outlined above are performed in reverse order. Second column sections 48 are locked to first column sections 44. Cylinders 52 are then extended as legs 20 to raise the base frame 14 above the height of the truck bed 90, as shown in FIG. 6C. The truck bed is backed beneath the frame 14 and the legs 20 retracted into columns 16. With the frame 14 resting firmly on the bed 90, the columns 16 are pivotally retracted into the frame, leaving the apparatus 12 folded in the truck bed 90 as shown in FIG. 6A.

From the foregoing, it is seen that apparatus 12 can be delivered, operated, and removed by a single person, such as the truck driver. For this purpose a hydraulic control console of conventional design (not shown) is provided, from which all hydraulic cylinders in the apparatus 12 can be independently or jointly controlled.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. An apparatus for loading and storing elongate load members, comprising:
   a base frame;
   at least two pairs of opposed extensible load support columns connected to the frame, the columns of each pair being laterally spaced across the frame from one another and each pair being spaced longitudinally of the frame from the other pair;
   load support means on each column of a pair for cooperatively raising and supporting a load therebetween with the columns extended;
   extensible leg means connected to the base frame to raise and lower the frame for loading and unloading the base frame from a vehicle;
   the extensible leg means comprising sections of said extensible columns;
   each column inlcuding means for extending said column in an upward direction from said base frame and means for extending said extensible leg means and base frame relative to one another to elevate said frame;
   said means for extending said column and said means for extending said leg means including a common fluid-powered extensible cylinder means;
   said extensible leg means comprising said extensible cylinder means.

2. The apparatus of claim 1 includes power means for pivotally retracting and extending each column.

3. The apparatus of claim 1 wherein the base frame comprises rigid bridging means including a center section to support a load and a vehicle and opposite end ramp sections to enable the vehicle to drive across the center section to load and unload members onto the base frame.

4. The apparatus of claim 3 wherein the base frame includes means defining a recess within the center frame section for each column and the apparatus includes power means for pivotally retracting each column into a recess.

5. An apparatus for loading and storing elongate load members, comprising:
   a base frame;
   at least two pairs of opposed extensible load support columns connected to the frame, the columns of each pair being laterally spaced across the frame from one another and each pair being spaced longitudinally of the frame from the other pair;

load support means on each column of a pair for cooperatively raising and supporting a load therebetween with the columns extended;

extensible leg means connected to the base frame to raise and lower the frame for loading and unloading the base frame from a vehicle;

said base frame comprising rigid bridging means including a center section to support a load and a vehicle and opposite end ramp sections to enable the vehicle to drive across the center section to load and unload members onto the base frame;

a load-retaining stake mounted inwardly of each column to retain a load on the center section of the base frame.

6. The apparatus of claim 5 including a retaining guide mounted to each column for retaining the load as it is raised by the load support means from the load-retaining stakes, the stakes and guides substantially aligned.

7. The apparatus of claim 5 including adjusting means for adjusting the upright position of a column to accommodate incline of the base frame.

8. The apparatus of claim 5 wherein each column includes a first section mounting the base frame, a second section extensible upwardly relative to the first section to raise a load, and a third section extensible downwardly relative to the first section to raise the frame.

9. The apparatus of claim 5 wherein the means for extending each column upwardly and downwardly comprise a common extensible fluid cylinder.

10. The apparatus of claim 1 comprising:
means for retracting each column within and raising each column from the base frame.

11. The apparatus of claim 10 wherein the base frame includes a center section to support a load and a vehicle and opposite end ramp sections to enable the vehicle to drive onto the center section.

12. The apparatus of claim 11 wherein the base frame includes means defining a recess for each column and the apparatus includes power-operated means for pivotally retracting each column into a recess.

13. The apparatus of claim 10 including adjusting means for adjusting the upright position of a column to accommodate incline of the base frame.

14. The apparatus of claim 9 wherein each column has a first section connected to the frame and a second section that extends and retracts relative to the first section;
means for extending the second section relative to the first section;
lift multiplier means mounted to the second section of each column for raising the load support means and thereby a load a multiple of the distance the second section extends.

15. The apparatus of claim 14 in which the load support means comprises a column cable affixed to each column and an intermediate cable connectable to each column cable to connect the columns of each pair, the column cables having a first end fixed to the first section of a column and a second end connectable to the intermediate cable to support and raise the load.

16. The apparatus of claim 15 in which the lift multiplier means comprises a surveiling fairlead means through which the column cable extends.

17. The apparatus of claim 14 in which each column includes an elongate retaining guide stake atop the column and extending upwardly therefrom for retaining the load as it is raised above the column.

18. The apparatus of claim 14 including support means for enabling the load support means to extend below the load while the load is supported by the base frame.

19. The apparatus of claim 18 in which the support means comprise transverse elevated frame portions extending across the base frame between the columns of each pair for supporting the elongate load members apart from the base frame.

20. An apparatus for loading and storing elongate load members, comprising:
a base frame;
at least two pairs of opposed extensible load support columns connected to the frame, the columns of each pair being laterally spaced across the frame from one another and each pair being spaced longitudinally of the frame from the other pair;
load support means on each column of a pair for cooperatively raising and supporting a load therebetween with the columns extended;
extensible leg means connected to the base frame to raise and lower the frame for loading and unloading the base frame from a vehicle;
the base frame comprising rigid bridging means including a center section to support a load and a vehicle and opposite end ramp sections to enable the vehicle to drive across the center section to load and unload members onto the base frame;
a load-retaining stake mounted inwardly of each column to retain a load on the center section, said base frame including means defining longitudinal recesses along opposite sides of said center section for receiving said columns and stakes, each column and stake being pivoted to said base frame for movement between upright positions for supporting a load and retracted positions within said recesses to enable a vehicle to be driven across said center section, and power means for pivoting said columns and stakes between their upright and retracted positions.

21. The apparatus of claim 20 wherein said center and end ramp sections comprise transverse grating defining a bridge deck for supporting a vehicle driven across said sections, said columns in their retracted positions within said recesses having upwardly directed load-supporting surfaces substantially flush with the deck of the center section and providing a lateral continuation of said deck.

* * * * *

UNITED STATES PATENT AND TRADEMARK OFFICE
CERTIFICATE OF CORRECTION

PATENT NO. : 4,790,712
DATED : December 13, 1988
INVENTOR(S) : DOSSIE M. BATSON

It is certified that error appears in the above-identified patent and that said Letters Patent is hereby corrected as shown below:

Column 1, Line 37, after "high" insert --for a logging truck to back its bed underneath the--.
Column 2, line 53, after "apparatus" insert --according--.
Column 4, line 34, "Fig." should be --Figs.--.
<u>In the Claims:</u>
Column 6, line 41, "inlcuding" should be --including--.
Column 7, line 49, "9" should be --5--.
Column 8, line 6, "surveiling" should be --swiveling--.

Signed and Sealed this

Twenty-ninth Day of August, 1989

Attest:

DONALD J. QUIGG

Attesting Officer     Commissioner of Patents and Trademarks